United States Patent
Scherzer et al.

(10) Patent No.: US 9,179,495 B1
(45) Date of Patent: Nov. 3, 2015

(54) IMPLEMENTING "ALL WIRELESS" NETWORK OVER WIFI EQUIPMENT USING "SCHEDULED TDMA"

(75) Inventors: Shimon B. Scherzer, Sunnyvale, CA (US); Patrick A. Worfolk, Campbell, CA (US); Armin D. Haken, San Francisco, CA (US); Subburajan Ponnuswamy, Folsom, CA (US); Ronen Vainish, Sunnyvale, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1625 days.

(21) Appl. No.: 10/615,095

(22) Filed: Jul. 8, 2003

(51) Int. Cl.
 *H04W 4/00* (2009.01)
 *H04W 84/12* (2009.01)
(52) U.S. Cl.
 CPC .................................... *H04W 84/12* (2013.01)
(58) Field of Classification Search
 CPC .... H04W 84/12; H04W 84/18; H04W 74/004
 USPC .......... 370/463, 442, 238, 328; 455/522, 502; 375/356
 See application file for complete search history.

(56) References Cited

U.S. PATENT DOCUMENTS

| | | | |
|---|---|---|---|
| 6,577,872 B1* | 6/2003 | Lundh et al. | 455/502 |
| 6,920,148 B1* | 7/2005 | Kato | 370/442 |
| 7,088,795 B1* | 8/2006 | Aiello et al. | 375/356 |
| 2001/0031621 A1* | 10/2001 | Schmutz | 455/7 |
| 2001/0031624 A1* | 10/2001 | Schmutz | 455/13.4 |
| 2002/0078072 A1* | 6/2002 | Tan et al. | 707/201 |
| 2002/0105970 A1* | 8/2002 | Shvodian | 370/468 |
| 2002/0145978 A1* | 10/2002 | Batsell et al. | 370/238 |
| 2002/0176396 A1* | 11/2002 | Hammel et al. | 370/347 |
| 2002/0196749 A1* | 12/2002 | Eyuboglu et al. | 370/328 |
| 2003/0058828 A1 | 3/2003 | Shearer, III | |
| 2003/0067891 A1* | 4/2003 | Jones et al. | 370/328 |
| 2004/0038697 A1* | 2/2004 | Attar et al. | 455/522 |
| 2004/0052227 A1* | 3/2004 | Judd et al. | 370/334 |
| 2004/0090312 A1* | 5/2004 | Manis et al. | 340/310.02 |
| 2004/0100989 A1* | 5/2004 | Chiu et al. | 370/463 |
| 2004/0160986 A1* | 8/2004 | Perlman | 370/480 |
| 2004/0181569 A1* | 9/2004 | Attar et al. | 709/200 |
| 2004/0203791 A1* | 10/2004 | Pan et al. | 455/442 |
| 2004/0208140 A1* | 10/2004 | Noguchi et al. | 370/328 |
| 2005/0102529 A1* | 5/2005 | Buddhikot et al. | 713/200 |
| 2006/0056492 A1* | 3/2006 | Honda | 375/132 |
| 2009/0154405 A1* | 6/2009 | Choi et al. | 370/329 |

\* cited by examiner

*Primary Examiner* — Wayne Cai
(74) *Attorney, Agent, or Firm* — Van Cott, Bagley, Cornwall & McCarthy (57) ABSTRACT

A technique is disclosed to schedule frame transmissions in a wireless network utilizing scheduled TDMA by synchronizing clocks in repeater and backhaul access points.

19 Claims, 9 Drawing Sheets

PRIOR ART

IMPLEMENTING "ALL WIRELESS" NETWORK OVER WIFI EQUIPMENT USING "SCHEDULED TDMA"

BACKGROUND

1. Field of the Invention

The present invention relates to wireless networks, and more particularly, to the benefits of scheduling transmissions in such networks.

2. Related Art

Wireless local networks (WLANs) based on the IEEE 802.11 standard have proven to be popular. IEEE 802.11 is a wireless standard related to the IEEE 802.3 standard established for wired Ethernets. In contrast to wired networks, an IEEE 802.11 WLAN must conserve the limited bandwidth presented by a wireless transmission medium. Accordingly, a set of rules in the IEEE 802.11 standard is dedicated to medium access control (MAC), which governs accessing the wireless medium and sending data through it.

The 802.11 rigidity and power allocation limits present severe challenges to users during network deployment and modification. Even if careful network planning is implemented, there may still be loss of bandwidth due to unpredictable circumstances such as a subscriber's movement and activity level. Further, with existing WiFi chipsets, bandwidth may not be fully utilized due to various factors, including unpredictable communication traffic and "hidden node" situations (which will be described below).

Figure 1A:
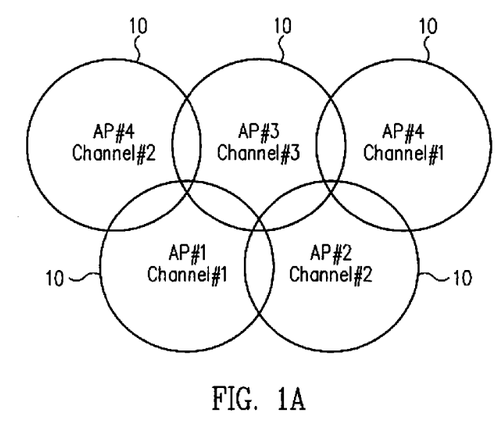
FIG. 1A illustrates cells with theoretical footprints for a conventional WLAN.

For example, FIG. 1A illustrates an ideal situation where each cell 10 has a circular coverage area. However, in reality, the coverage area of each cell 10 is not a circle. For example, in an enterprise application, such as in a building with large numbers of walls and offices, numerous APs and STAs are needed to allow STAs to transfer information between each other. The walls and other barriers result in non-uniform coverage areas for each cell 10.

Figure 1B:
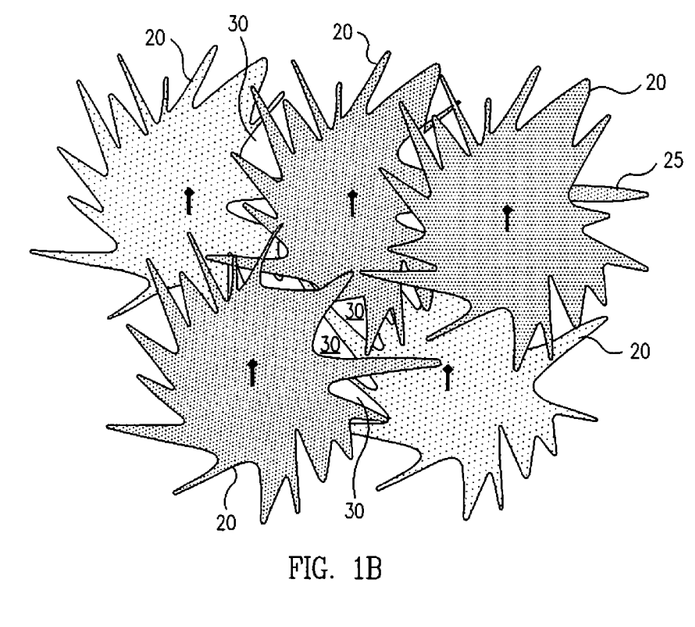
FIG. 1B illustrates an example of cells with realistic footprints in an enterprise.

FIG. 1B shows coverage areas or cells 20 in a practical WLAN environment. As seen, the coverage areas are no longer uniform circles, but are irregular having areas of broader coverage (the peaks) and areas of lower coverage (the nulls). For example, long peaks 25 may correspond to long hallways in the building. Because cells 20 do not have uniform coverage, "holes" 30 exist in the network, where communication is not possible. Holes 30 do not necessarily represent areas where no frames can be sent and received; however, only a small percentage of dropped frames may be enough severely disrupt TCP/IP behavior, thereby effectively ending communication ability within that area.

A possible solution to "fill" holes 30 may be to increase the density of the APs in the WLAN, i.e., move the APs closer to each other, which requires more APs for the same outer coverage area. However, increasing the density of the APs will result in increased interference between APs and STAs, while also increasing the cost of the system. Consequently, in order to reduce interference, the transmit power of the APs must be reduced. But, this may again result in holes in the WLAN coverage due to irregular coverage "footprints" of the APs at an additional cost of a reduction in maximum throughput of the system.

Thus, even if throughput can be increased, the network operator must continually adjust parameters of the WiFi network, such as power, frequency, and location. This increases the complexity in setting up and maintaining an optimal network.

Another challenge in deploying WiFi networks is the need for wiring. Each access point must be fed by a wire through regular network infrastructure. Even when LAN wiring already exists, it seldom fits the specific needs of radio based network, e.g., connecting socket locations are normally at lower sections of the walls while the location of access points is desired to be at the highest places (for better radio coverage). In many cases, people prefer to segregate the radio network from the wire-line network for security reasons. If the radio network could be supported by wireless backhaul instead, deployment could be less expensive and flexible. Significant amount of art has been published relative to this subject, such as mesh networks. However, mesh networks or any wireless backhaul that relies on native 802.11 standards suffers from prohibitive bandwidth loss. When one node in such a network is active, all other nodes around it must be silent, hence unable to communicate. A method to increase the transmission efficiency by overcoming this shortfall is required to implement efficient wireless backhaul. The deficiencies of WiFi in producing multi-hop ("mesh networks") have been described in many papers. An example is "Revealing the Problems of 802.11 Medium Access Control in Multi-hop Wireless Ad Hoc Networks" by Shugong Xu and Tarek Saabdawi, published in "Computer Networks" magazine in 2002, that emphasized particularly the difficulties of TCP/IP in this environment.

In general, ad hoc, distributed control wireless networks, in particular 802.11 based, are not very suitable to multi-hop communications. An example of shared media (point-to-multipoint) based protocol that is used is the cable modem standard (DOCSIS). This protocol is a clear example of centralized control in shared media. Elements of this protocol were adopted by the WWAN industry (802.16).

Accordingly, there is a need in the art for improved techniques for scheduling transmissions in wireless networks, such as WiFi, that avoids the disadvantages of conventional methods discussed above.

SUMMARY

In accordance with one aspect of the invention, a wireless local area network (WLAN) includes a plurality of stations (STAs), a plurality of repeater access points (APs), a plurality of backhaul APS, and a central controller. The repeater APs incorporate two transceivers of two different WiFi bands (e.g., 2.4 GHz and 5 GHz) that are able to communicate between themselves to create a network bridge. This bridge allows information received by one transceiver to be sent to the second transceiver, which in return can send information to another transceiver (e.g., a station or another AP). The backhaul APs can be identical to the repeater APs or simple, single transceiver APs. The central controller and backhaul APs may reside in the network closet, where the backhaul APs are further grouped together. The central controller schedules the transmissions between backhaul APs and repeater APs, between repeater APs and other repeater APs, and between repeater APs and STAs.

The present invention allows multiple WiFi transceivers to transmit at the same time by synchronizing access points across the network and using scheduled TDMA. The central controller, based on network traffic, can schedule more or longer transmission slots for one AP than for another AP during any time interval. Further, based on various network and transmission characteristics, the central controller may determine which transceivers may transmit simultaneously at which times.

Scheduled TDMA is defined as methods of making WiFi transceivers operate in time division multiple access (TDMA) and, by synchronizing all access points in the network, one can force multiple transceivers to transmit at the same time. By re-packing data, transmissions can be divided into time slots of equal or of variable length. Knowing which transmissions can co-exist without interfering with each other (spatial compatibility) allows the system controller to determine which transmissions may execute in parallel. A detailed description of this method is described in commonly-owned U.S. patent application Ser. No. 10/306,972, entitled "Space-Time-Power Scheduling For Wireless Networks", filed Nov. 27, 2002. The central controller may grant transmission slots as necessary based on traffic to be delivered. For example, if a first AP has more data to transmit and a second AP does not, the central controller can grant more transmission slots or longer transmission slots to the first AP.

Scheduled TDMA may also be utilized for wireless backhaul. A central controller may schedule simultaneous transmissions inward to or outward from a backhaul AP at the center or nexus of a network. This network has repeater APs that can be viewed as a series of concentric circles or spheres about the center. The repeater APs may have bands that can be used for backhaul and bands that can be used for communication with STAs. Since non-interfering simultaneous transmissions in one direction can be determined, multiple such transmissions can be scheduled within the network to increase network throughput. Several such networks can share the same physical space. Each network operates on a single frequency channel, such that when simultaneous transmissions are not possible in one network, the transmissions can be scheduled or moved to another network operating on a different frequency channel.

In one embodiment, communication between the repeater APs and backhaul APs 216 is by scheduled TDMA, while communication between both APs and the STAs is a mix of scheduled TDMA and standard WiFi (e.g., DCF). Another embodiment uses scheduled TDMA between backhaul APs and repeater APs and standard 802.11 between repeater APs and clients. In addition, transmission can be unidirectional, i.e., no separate ACK packet per frame, instead accumulating the ACKs within a message that is going in the opposite direction. This method increases the probability of finding concurrent connections. When scheduled TDMA is used as for the first embodiment, the central controller schedules the transmissions on the backhauls and between repeaters APs and STAs. When standard 802.11 is used between repeater APs and clients, the central controller schedules only the connections between the backhaul and repeater APs. The central controller synchronizes the clocks of the APs so that it can schedule (or grant) and allocate time slots.

Although wireless backhaul techniques are well known in the art (e.g., "multi-hop network" and mesh networks as mentioned above), these methods are very unsuitable for standard 802.11-based networks. Any node that is transmitting will silence any nodes in its reach, while any node receiving requires all nodes in reach to be silenced as well. This means that only a small fraction of the network nodes can be active, thereby significantly reducing network bandwidth and rendering the wireless backhaul essentially useless. Scheduled TDMA (e.g., capitalizing on RF Routing technology, which is described in commonly-owned U.S. patent application Ser. No. 10/306,972, incorporated above) alleviates this problem, allowing backhaul efficiency to be very high (approaching 100%). Backhaul efficiency is defined as the percentage of time data is streaming on the network backhaul. For example, if when every time a repeater AP connected to a network backhaul AP is transmitting, the backhaul AP must not transmit, the best efficiency that can be achieved is 50%. The proposed approach using AP synchronization and scheduled TDMA on top of 802.11 PHY allows all APs to transmit together, hence the efficiency increase.

This approach will allow fast and easy deployment of WLAN. Whenever more bandwidth is needed, the user may add additional access points to the network without the need for detailed planning and wiring. Further, the APs of the present invention do not need to be continually adjusted, such as continually monitoring and adjusting transmission power levels for the APs. In one embodiment, the power level of the APs is maintained at the maximum.

Other advantages provided by the present invention are 1) easy deployment, since network devices, such as APs, are standard off-the-shelf components that may only require minor modifications, 2) larger number of concurrent transmissions in the network, 3) increased expected data rate for clients, 4) reduction in data rate fallback loss (normally experienced in closed loop rate control), 5) more efficient transmission power control for the STAs, 6) less effect of external interference, 7) easier packet fragmentation and transmission re-tries, and 8) reduced power required by the stations.

The invention will be more fully understood upon consideration of the following detailed description, taken together with the accompanying drawings.

BRIEF DESCRIPTION OF THE DRAWINGS

Use of the same or similar reference numbers in different figures indicates same or like elements.

DETAILED DESCRIPTION

In accordance with one aspect of the invention, a time division multiple access (TDMA) based method is used to schedule transmissions in a wireless network, such as 802.11 or WiFi. Data traffic through the network is scheduled for specific time slots so that only those sets of links that can share the wireless medium are active simultaneously and all traffic is granted time to reach its destination.

Figure 2:
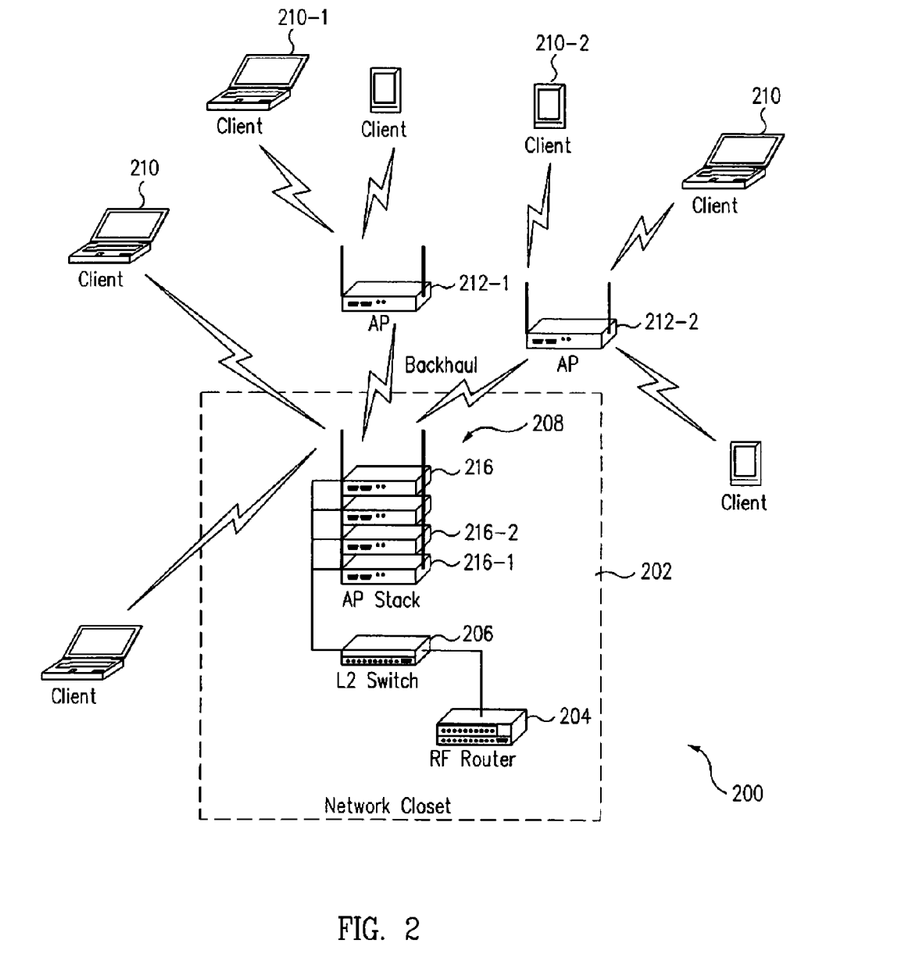
FIG. 2 is a block diagram of a wireless LAN according to one embodiment of the invention.

FIG. 2 shows a block diagram of a wireless LAN network 200 that utilizes TDMA scheduling according to one embodiment of the present invention. A network closet or center 202 includes a central controller 204, a switch 206, and an access point (AP) stack 208 (backhaul APs). In another embodiment, backhaul APs are located in different locations, i.e., not co-located. Network closet 202 may be located at a suitable location in the network or enterprise, such as within a closet, on a roof, or on a ceiling, to provide sufficient coverage for clients, stations (STAs), or users 210 within network 200. Central controller 204 (1) collects received signal strength information (RSSI) from repeater access points (or AP transceivers) 212 for each STA or AP heard, (2) estimates the RF reception conditions at the STAs and APs if certain transmissions are to be executed, (3) collects information about data traffic load based on monitoring the APs as well as monitoring the data traffic that is in some embodiments routed through the controller, (4) schedules transmission opportunities (slots) from APs and STAs based on traffic distribution and anticipated carrier to interference and noise ratio (CINR) to maximize the CINR conditions at receive points, number of concurrent transmissions, and hence network throughput, and (5) pre-assigns transmission data rate per frame to avoid data rate fallback. Central controller 204 may also be referred to as a router, an RF router, or radio processor and is described in commonly-owned U.S. patent application Ser. No. 10/306, 972, entitled "SPACE-TIME-POWER SCHEDULING FOR WIRELESS NETWORKS", by Shimon Scherzer and Patrick Worfolk, incorporated by reference in its entirety. Central controller 204 allows a standard 802.11 multiple APs based network to be modified and operate as a scheduled TDMA based network, as will be described in detail below.

A multi-hop network, such as described above, presents some unique problems if based on standard 802.11 technology. To facilitate connectivity among access points (e.g., repeater APs 212 and backhaul APs 216) within network 200, the typical distance between these access points must be similar to the distance between the access points (212 or 216) and clients or STAs 210. As a result, network cells (or BSSs) are greatly overlapping. Consequently, unless exotic antenna techniques are employed, network bandwidth is expected to be rather small, since each time a network transceiver transmits, all the transceivers that "hear" the transmitting transceiver must not transmit. Since there is significant BSS overlap, the probability of any transceiver to be transmitting is very low, resulting in poor network bandwidth.

Transmission coordination of the present invention mitigates the above shortcomings. Central controller 204 is used to schedule transmissions based on estimated signal conditions (C/I) at the designated receivers, hence allowing many more concurrent transmissions than in a standard 802.11 network. The scheduling is designed to maximize the network throughput at all times by first checking which transmissions can be executed simultaneously. Simultaneous transmission requires AP clock synchronization, as detailed below. Otherwise, since multiple transmissions can be detected by the wireless MAC module within typically a few μsecs, transmissions may cease unless AP time synchronization is within that range.

The data transmission time slots are dynamically assigned by the central controller to combinations of wireless connections which can be active simultaneously. The assignment is based on various factors, such as load, delay, and traffic. Traffic and delay are monitored by collecting reports from the APs and can also be monitored directly in those embodiments where the data traffic passes through the central controller. In one embodiment, all the slot lengths are equal and the slots are filled according to the amount of data queued for a particular destination. In another embodiment, the slot assignments are somewhat randomized to avoid repetition of unfavorable combinations.

The slots can also be made different lengths, corresponding to the data traffic that needs to be sent by those connections granted use of the slot time. Given a collection of sets of connections such that each set is capable of having all its connections simultaneously active without mutual interference, a schedule can be computed using a linear programming algorithm (known to those familiar with the art). For example, let $S_1$ to $S_n$ be the sets of simultaneously feasible connections. Each set $S_i$ will be granted a corresponding slot time $a_i$. The lengths of slot time $a_i$ are constrained to be long enough to permit the required amount of data to be sent along the connections activated in $S_i$. Linear programming is used to minimize the sum of the lengths $a_i$ for i between 1 and n, subject to these constraints. The resulting slot lengths are in the most efficient ratio to each other. The system can make best use of the slot lengths when the data packets are aggregated for transmission between the APs as explained later.

Once central controller 204 receives and processes the required information (as described above), the schedules and other control information is sent via switch 206 coupled to central controller 204 to AP stack 208. In some embodiments, all external data traffic from and to the APs and stations travels through the central controller and the switch, which provides layer 2 connection between the central controller and the APs.

A plurality of APs 216 (or backhaul APs) are stacked or co-located within AP stack 208. When 802.11(a) is used for backhaul, twelve APs 216 can be stacked; however, if 802.11 (b) or 802.11(g) is used, three APs 216 can be stacked. Note that AP stack 208 does not need to be a physically confining device. In one embodiment, each AP 216 (or AP transceiver) is a standard off-the-shelf 802.11 device. Each AP 216 is tuned to a different frequency channel, with the number depending on whether the AP is an 802.11(a) or 802.11(b) device. Thus, multiple channels can be used for backhaul connectivity to the repeater APs 212. When the backhaul APs are not collocated, the channel limits are eliminated and there is no constraint on the number of backhaul APs. Communication between repeater APs 212 and backhaul APs 216 is by TDMA, while communication between APs (212 or 216) and STAs 210 is a mix of scheduled TDMA and standard WiFi (DCF). Thus, a wireless LAN can be deployed by grouping backhaul access points in the network main closet or spreading backhaul access points around the establishment wired to the main closet, each set on a different frequency channel, to feed repeaters access points that replace the traditional wired access points to form a wireless connection.

Each backhaul AP 216 in AP stack 208 may use high gain, directional antennas to communicate with repeater APs 212 to maximize range and minimize interference. In one embodiment, an antenna with a gain of 15 dBi and about 30° beam width is used, although other antennas may be suitable. Since the connection between backhaul APs 216 and repeater APs 212 is effectively "point-to-point", effective radiated power (ERP) can be substantially higher, thereby increasing the backhaul range and allowing higher data rates and better penetration.

Repeater APs 212 can also be standard off-the-shelf 802.11 access points, modified to serve as "wireless-to-wireless bridges" between the STAs and backhaul APs. The transceiver for repeater APs 212 can be used for both backhaul and for communication with STAs 210 (also referred to herein as client serving). Each AP 212 and/or 216 may communicate with a plurality of N stations (STAs). STAs may include laptop PCs and handheld devices, such as PDAs. These devices can be mobile, portable, or stationary. AP devices also contain an 802.11 conformant MAC and PHY interface to the wireless medium and provide access to a distribution system for associated stations.

In one embodiment, repeater APs 212 have two radios (e.g., an 802.11(a) and an 802.11(b)), one used for backhaul communication and one for client serving or communication.

Because each repeater AP 212 may be used for different communications to different devices, as seen in FIG. 2, repeater APs 212 may use two different antennas for the different communications. In one embodiment, repeater APs 212 utilize an antenna that is omni-directional (used for client serving) and a high directional antenna aimed at backhaul APs 216 (used for backhaul communication). In one embodiment, the high directional antenna for repeater AP 212 is similar to the ones used with transceivers of the backhaul APs described above. With networks in which repeater APs 212 operate in dual-band, i.e., capability for both 802.11(a) and 802.11(b), backhaul communication can be handled through 802.11(a) and client communication can be handled through 802.11(b), in one embodiment. Other channel assignments may also be suitable for the present invention.

However, in conventional systems, collocated multiple channel operation is not practical due to issues such as inter-channel interference, even if different frequency channels are used. The present invention uses central controller 204 to synchronize AP transmissions, thereby minimizing inter-channel interference and allowing simultaneous multi-channel transmissions. Besides synchronizing the transmissions between the APs, the present invention specifies that the data can be packed efficiently into the allocated transmission time slots. By combining the data from IP packets and pieces of IP packets, a specific amount of transmission time can be efficiently used for a unidirectional transmission. An acknowledgement and possible request for re-transmission of part of the data can be returned later. Unidirectional transmissions, not interleaved with returning acknowledgement packets are much more amenable to simultaneous non-interference than the standard 802.11 transmissions. For the transmission to the stations or back into the wire, the packets are reassembled back into their original lengths.

A further reason time synchronization is needed is due to the fact that when multiple access points are collocated, such as within AP stack 208, transmission on one channel may hamper transmission on another channel due to "RF leakage", i.e., the modulation spectrum tends to spread into other frequency channels. So, even though 802.11(a) may use many frequency channels (up to 12 channels), it may be quite hard to capitalize on this available spectrum when multiple 802.11 transceivers are collocated. For example, if the signal level is not low enough and isolation is not great (as for typical 802.11 equipment), it may hit the intermediate RF circuits directly. To avoid this, all transmissions may be synchronized such that all collocated transceivers or APs will either be transmitting or receiving at each instance. Both backhaul and repeater APs must be operated in TDMA mode. This synchronization will not allow for one transceiver to transmit while another one is trying to receive. In this case, the effects of the inter-channel interference can be eliminated and all frequency channels can be simultaneously used.

However, 802.11-based equipment is not designed for TDMA operation since the common DCF protocol requires entirely different functionality. For example, in 802.11, every transceiver may access the channel at any time, provided the carrier sense mechanism (e.g., CSMA/CA) permits (no energy or carrier is being sensed). This means that channel access timing is very random, which is contradictory to TDMA operation.

Thus, to accurately synchronize the transmissions, access points must be time synchronized. If standard WiFi equipment is to be used (e.g., off-the-shelf access points), the only way to access the devices is through an Ethernet connection. Furthermore, the access points may use Ethernet connections that share other network traffic, which could cause significant variation in message latency, thereby make the synchronization process much more difficult.

Figure 3:
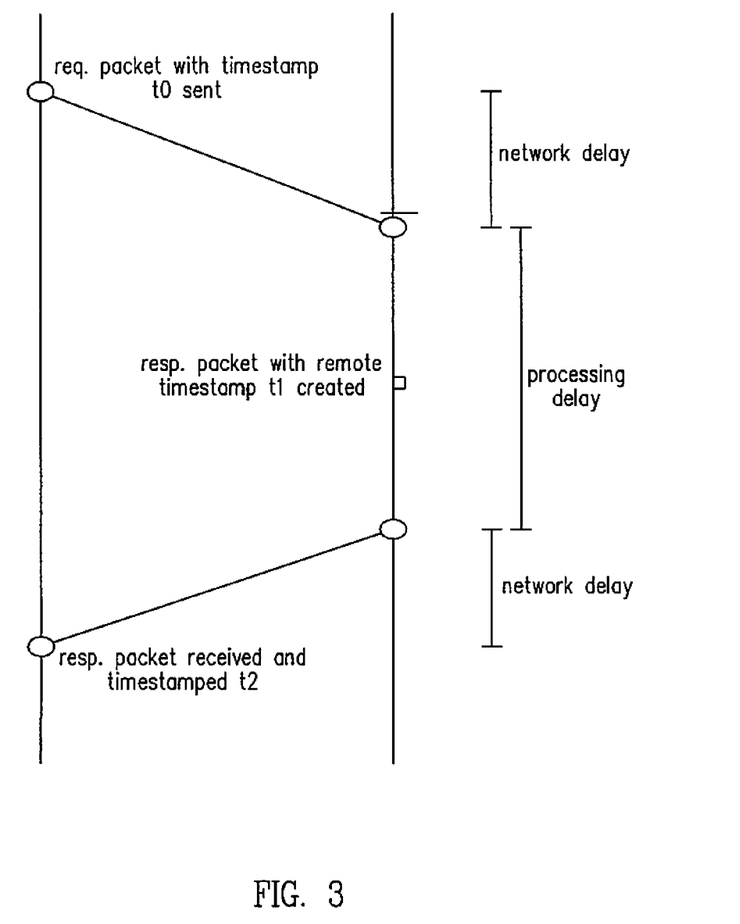
FIG. 3 is shows the timing of time synchronization request and response packets according to one embodiment.

According to one embodiment of the invention, a first "coarse" time synchronization is obtained through an Ethernet connection. Central controller 204 is connected to backhaul access points 208 and repeater access points 212. Periodically, each AP 208 and 212 will receive a time synchronization request (Time_Synch_Req) packet from central controller 204. In one embodiment, central controller 204 sends five packets per second. In response, the specific access point (either backhaul AP 208 or repeater AP 212) responds with a synchronization response (Time_Synch_Resp) packet. As a result of this interchange, central controller 204 obtains three time stamp values: 1) the time $t_0$ the query (Time_Synch_Req packet) was sent, 2) the local time $t_1$ at the access point when the response (Time_Synch_Resp packet) was generated, and 3) the arrival time $t_2$ of the response. When the clocks are synchronized and when the round trip time of the interchange is short, the second time stamp value is expected to be in the middle between the first and third time stamps, as shown in FIG. 3. However, practically, factors, such as channel variations, processing delays, and communication traffic, introduce delays that shift the second time stamp from the middle.

Central controller 204 stores a number N (120 in one embodiment) of the most recent sets of time stamps and calculates the AP clock offset (i.e., the time difference at the sampled instance) and clock skew (i.e., the difference between "ticking" rate of the clocks). Periodically, central controller 204 sends a time set command (Time_Synch_Set) packet to the AP instructing how to adjust its local clock. The period can be after intervals in which central controller 204 has determined adjustments, if any, to the clock offset and skew, as discussed below. In response, the AP then sends an acknowledgement (Time_Synch_Set_Ack) and makes the necessary adjustments for time synchronization.

In one embodiment, the calculations required to keep the clocks in the APs adjusted are performed in central controller 204, such as by a synchronization module. This allows simplifying the process within the APs, thereby providing the advantages of simpler deployment, fewer processor cycles used at the AP, and easier tuning and change to the synchronization algorithm once the networks are deployed. Calculations may also be performed within the APs or an external processor. Central controller 204 operates individually on each AP that it is synchronizing and sends individually directed Time_Synch_Req packets. In other embodiments, the packets may be sent by broadcasting or multicasting; however, this may cause queuing delays.

Regardless of how the packets are sent and received, central controller 204 obtains the most recent N (N=120 in one embodiment) sets of time stamps for an AP and generates an estimate of the time difference and clock skew at the AP. The information contained in each set of time stamps allows central controller 204 to calculate the total communication or round trip time $t_{rt}$, a reference time $t_r$, the AP's time $t_{AP}$, and the time difference $t_□$ as follows:

$$t_{rt}=t_2-t_0$$

$$t_r=(t_0+t_2)/2$$

$$t_{AP}=t_1$$

$$t_□=t_1-t_r$$

Figure 4A:
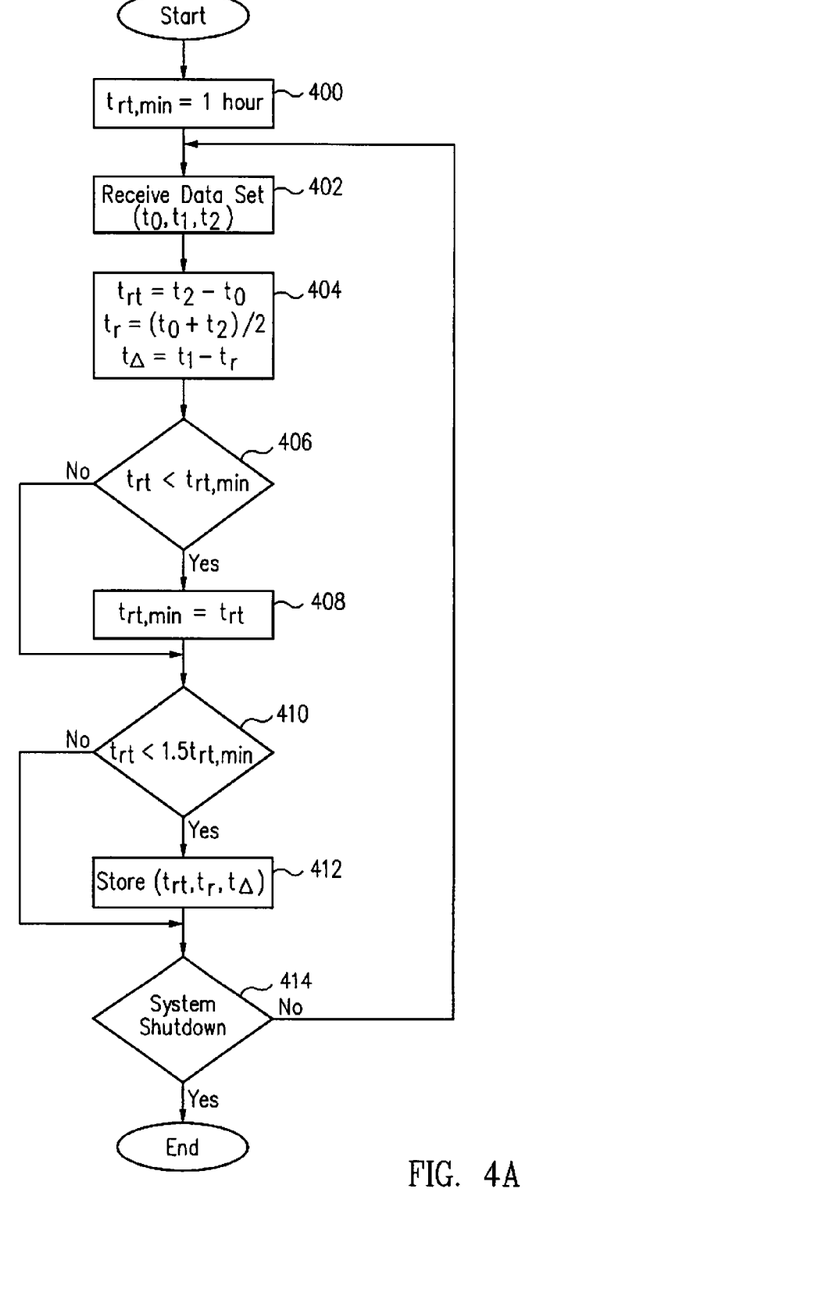
FIGS. 4A and 4B are flowcharts illustrating an example of coarse time synchronization.
Figure 4B:
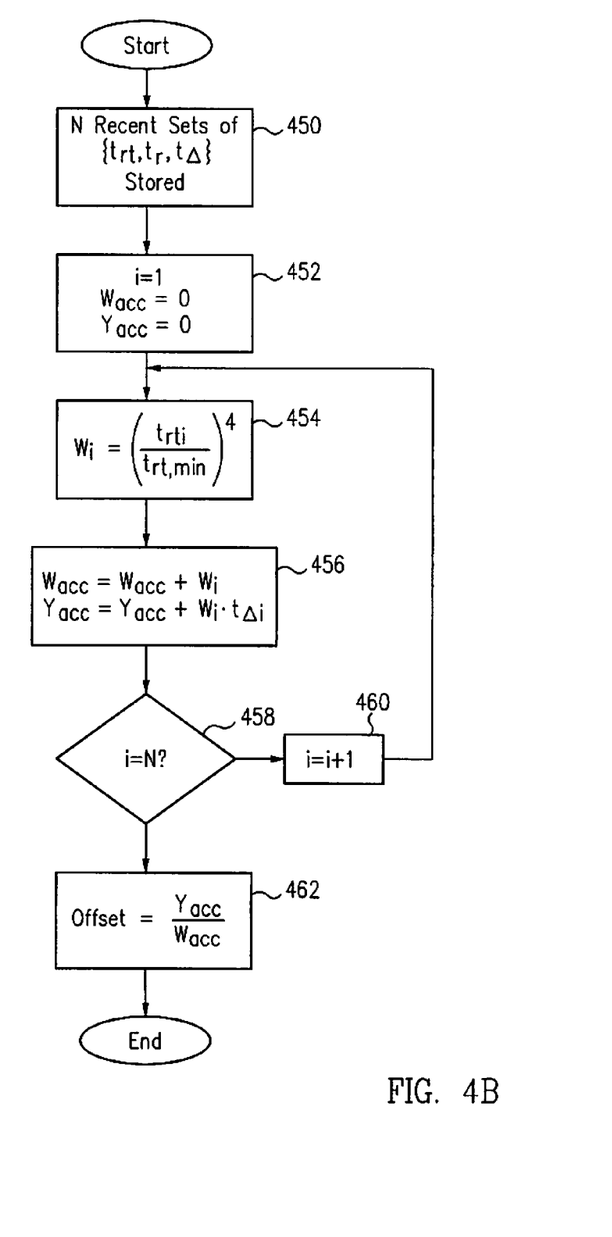

FIGS. 4A and 4B are flowcharts showing one embodiment for determining the AP clock offset and skew. FIG. 4A is a flowchart showing the receiving and storage of times $t_{rt}$, $t_r$, and $t_\square$ and determining the minimum time $t_{rt,min}$ of the times $t_{rt}$ for use by central controller 204 to determine clock offset and skew. In step 400, $t_{rt,min}$ is set or initialized to one hour, in one embodiment. Other initial times can also be used. Central controller 204 then receives time stamps $t_0$, $t_1$, and $t_2$, in step 402, and calculates $t_{rt}$, $t_r$, and $t_\square$ from these time stamps, as specified above, in step 404. The current time $t_{rt}$ is then compared to $t_{rt,min}$, in step 406. If $t_{rt}$ is less than $t_{rt,min}$, $t_{rt,min}$ is set to the current time $t_{rt}$ in step 408. Otherwise, $t_{rt,min}$ remains unchanged. Then, in step 410, the current $t_{rt}$ is compared against $1.5 * t_{rt,min}$, in step 412. If $t_{rt}$ is larger than $1.5 * t_{rt,min}$, that set of time stamps is discarded. This is because samples with the shortest total time $t_{rt}$ are the most reliable for determining the true difference between the AP's time $t_{AP}$ and the reference time $t_r$, but other samples with fairly small times $t_{rt}$ may also yield useful information. Long times $t_{rt}$ are unreliable and should not be used in the determination. Thus, central controller 204 must decide which sets of time stamps to use for calculating the clock offset and skew. In this embodiment, all sets that have $t_{rt} \geq 1.5 * t_{rt,min}$ are not used.

However, if $t_{rt}$ is less than $1.5 * t_{rt,min}$, as determined in step 410, those time stamps ($t_{rt}$, $t_r$, and $t_\square$) are stored, in step 412, as one of the N sets of time samples for later use by central controller 204. The process of receiving $t_\square$, $t_1$, and $t_2$, then setting $t_{rt,min}$ to the smallest encountered sample $t_{rt}$ continues, as well as the process of storing sets of $t_{rt}$, $t_r$, and $t_\square$ that meet the requirement of step 410, until a system shutdown condition is detected, in step 414.

FIG. 4B is a flowchart showing an embodiment for calculating the clock offset from the set of time samples stored in FIG. 4A. In step 450, the most recent N sets of $t_{rt}$, $t_r$, and $t_\square$ are used. Counter i is initialized to one, while variables $w_{acc}$ and $y_{acc}$ are initialized to zero, in step 452. A weighting factor w is calculated in step 454 as follows:

$$w_i = t_{rti}/t_{rt,min})^4$$

Weighting allows longer $t_{rt}$ times to be less highly weighted (or reduced) because smaller $t_{rt}$ times are more reliable. Note that the exponent for the weighting and the multiplier for determining usable data can be other integer or non-integer numbers. Variables $w_{acc}$ and $y_{acc}$ are then updated, in step 456, as follows:

$$w_{acc} = w_{acc} + w_i$$

$$y_{acc} = y_{acc} + w_i t_{\square i}$$

with the current time difference $t_{\square i}$ weighted by $w_i$. If the current data is not the last time sample (i.e., i<N), as determined in step 458, the counter (which was initialized in step 452) is incremented in step 460. Processing continues with the next time sample at step 454. Once all N sets have been processed, a clock offset is calculated, in step 462, as follows:

$$\text{offset} = y_{acc}/w_{acc}$$

Skew can be determined, in one embodiment, by fitting the scaled time points ($t_r$, $t_\square$) to a line y=ax+b once all usable samples have been weighted or scaled. In one embodiment, least squares is used for line fitting, although other line fitting algorithms and methods can also be used. The least squares method calculates a line that minimizes the standard deviation of the distances of the points from the line, as is known in the art.

Once a line is calculated, the current clock offset is the height of the line at the present time and the clock skew is 1+the slope of the line. The offset and skew can be determined for the particular backhaul AP 216 or repeater AP 212. A line with a slope a>0 indicates that the AP's timer is skewed fast. The clocks at the APs are based on a timer g, which is the internal timer at the AP. Each AP will have its own value of g depending on when the device was turned on. In each case, there are two adjustment values m and p to convert the internal timer g to system time according to the formula system time=m*g+p. As g advances, that allows the AP to find the system time. When the AP's clock is adjusted, it is done by adjusting m and p, while g advances in the normal way as a timer. To adjust for offset b, p is replaced with p−b. To adjust for skew s, m is replaced by m/s. The adjustments are made the same way when b is positive or negative and when s is greater or less than 1. The line y=ax+b also allows central controller to determine or estimate the AP's current local time offset (represented by y) for any given current time (represented by x).

According to another embodiment, the line can be more accurately determined if a further iteration is performed. Once the line is determined with time samples $t_{rt} \geq 1.5 * t_{rt,min}$ (or by other criteria) discarded, additional time samples that are far away from the line are discarded and a new line calculated. In one embodiment, points whose distance from the line is more than 3 times the median distance are discarded, and a new line is recomputed with the remaining points, by least squares or other suitable methods.

Whenever a Time_Synch_Set instruction or message is sent and acknowledged, the stored data points are discarded since they no longer correspond to the AP's timer. However, in other embodiments, these points could also be kept and the y values recomputed to correspond to the adjusted timer at the AP. In one embodiment, the Time_Synch_Set message is sent every 5 seconds even when there is no adjustment to be made, i.e., adjustment is 0. Usually only the offset is adjusted. In one embodiment, the skew and offset both are adjusted every 75 seconds. Central controller 204, in one embodiment, sends updates periodically. In other embodiments, central controller 204 sends update messages only when an update is available. The timing and period of update messages depends, in part, on available bandwidth. Further, the time synchronization could be executed in distributed operation, e.g., the central function can be assumed by each AP or alternate APs provided there is sufficient computational power within the associated AP.

The above-described synchronization typically will not synchronize the AP clocks to within the accuracy needed for scheduled TDMA transmissions. For example, a wired Ethernet synchronization may only get the access point clocks within ±10 μsec. Thus, additional refining would be needed. Refining can be performed utilizing wireless signals that are commonly received by multiple APs that are to be synchronized.

When a frame generated by a client or STA 210 is received by an AP (either by repeater AP 212 or backhaul AP 216), that AP can "stamp" the incoming frame with a time tag. This time tag is generated by the AP's local clock. The frame (same frame or another related report) can be then be forwarded to central controller 204, such as to the synchronization module within controller 204. Central controller 204 associates the incoming frames or reports based on the fact the APs' clocks were already adjusted using the wire-line synchronization discussed above. When multiple reports from multiple APs have a similar time stamp (e.g., ±10 μsec), they can be considered as originated from the same transmitted frame.

Figure 5:
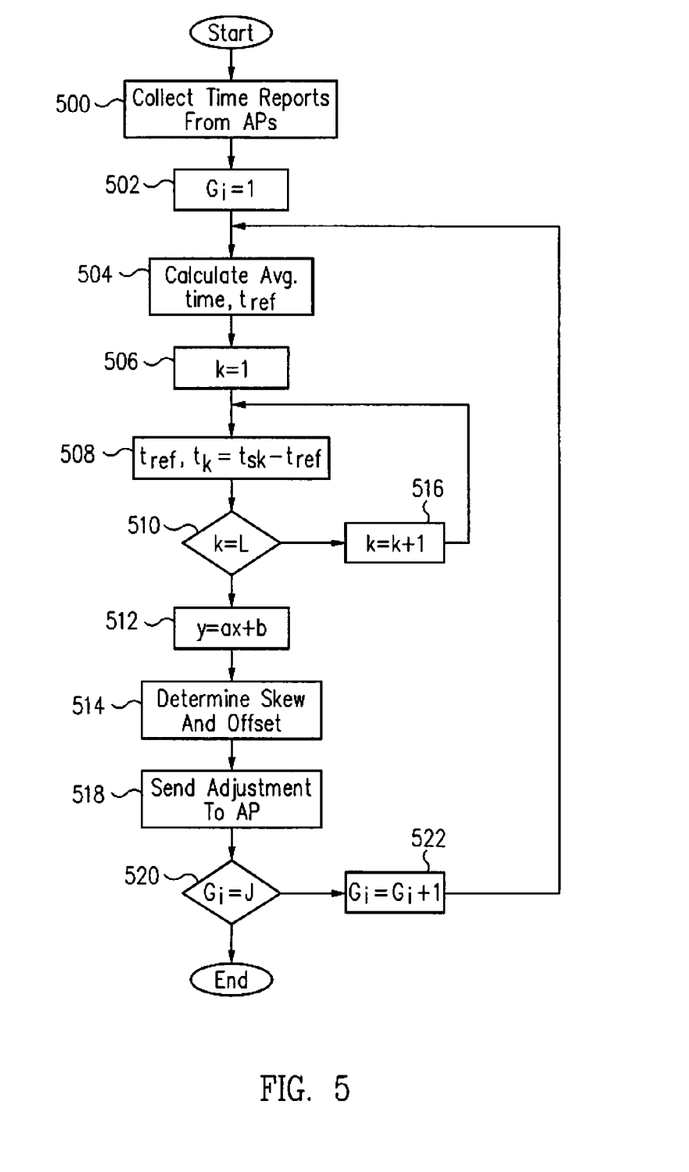
FIG. 5 is a flowchart illustrating an example of fine time synchronization according to one embodiment.

FIG. 5 is a flowchart showing one embodiment for refining the AP clock offset and skew. In step 500, central controller 204 collects J time tag reports from the APs (repeater APs 212 or backhaul APs 216). Central controller 204 processes data for each associated time reports group $G_i$, (e.g., from APS from APs having time stamps $t_s$ within ±10 μsec). Thus, in one embodiment, a counter ($G_i=1$ in step 502) or other suitable process is initiated to begin calculations on the first time reports group. An average time for that group is calculated, in step 504, to create a "reference time" sample, $t_{ref}$. Using $t_{ref}$, each time stamp within the group is adjusted. In one embodiment, a counter is initiated (k=1 in step 506). For each AP within the group, the time report value or time stamp is adjusted relative to the reference time $t_{ref}$ by subtracting the $t_{ref}$ from the time tag value $t_{sk}$ to obtain a referenced time tag $t_{ref,tk}$ in step 508. If this is the last time stamp in the group (i.e., k=L, where L is the total number of time stamps for the AP group), as determined in step 510, the adjusted samples $t_{ref,tk}$ are fit to a line y=ax+b, such as using least squares or another suitable algorithm, in step 512. A clock offset and skew are determined from the line, in step 514, similar to the process described above with respect to FIG. 4. The adjustment parameters are then sent by central controller 204 to the corresponding access point in step 518. However, if in step 510, is determined that there are more time stamps in the group, the counter is incremented in step 516 and processing continues at step 508 until all time samples in group $G_i$ have been adjusted.

After the clock offset and skew have been determined for a particular group, in step 514, processing continues with the remaining groups, if any. In one embodiment, if $G_i=J$ (the total number of time tag report groups), as determined in step 520, processing ends. However, if there are more groups (i.e., $G_i<J$), the groups counter $G_i$ is incremented by one, in step 522, and processing of the next group continues at step 504 with calculating the time reference $t_{ref}$ for the new group. This "fine" adjustment of the time synchronization refines the adjustments of the "coarse" adjustment of FIG. 4 to an accuracy sufficient for scheduled TDMA of the present invention.

The "fine" and "coarse" adjustments are interleaved. If only "fine" adjustments are made, then different subsets of the APs can end up each synchronized within the subset but with the subsets at quite different times from each other. The "coarse" adjustments are required to keep those APs or sets of APs that cannot detect each others' wireless signals synchronized.

In one embodiment, for every four time adjustments based on "fine" data, one is made based on the "coarse" data. To minimize the disturbance of the synchronization, the "coarse" adjustments are attenuated as follows: For a "coarse" offset b with 0☐b☐50 μs, the actual adjustment made is ($b^2$+49)/50 (rounded down to the nearest whole μs).

According to another embodiment, a closed loop approach can be used for additional refinement of the AP clocks. In this embodiment, time synchronization between access points is further adjusted by capitalizing on the 802.11 CCA (Clear Channel Assessment) operation. The AP will not transmit if a sufficient amount of time ahead of the transmission the channel was occupied. In one embodiment, this is approximately 4-15 μs. For example, if two APs are not well synchronized and one starts transmitting ahead of the second, the second AP's detector may detect the first AP transmission and disable the second AP's transmission. This behavior can be used to synchronize multiple APs when at least two are hearing each other. If two APs are instructed to transmit at a certain time and one does not execute, the transmission time of the non-executing AP should be advanced (for example, a few microseconds, such as 2 μs) until the AP start transmitting. This embodiment may be used for directly connected APs in a "star" configuration or for a non-directly connected configuration (e.g., multi-hop) since connection latency impact can be virtually eliminated.

The above time synchronization algorithms can be carried out at the intermediate nodes of the network as well as at the central controller. The nodes can be synchronized by their neighbors in a distributed algorithm so that the controller synchronizes the backhaul APs which in turn synchronize the repeater APs.

Still another embodiment of time synchronization utilizes wireless beacon signals. All devices that hear a time beacon can set their clocks according to the time encoded in the beacon signal or use the signal arrival time to lock to a repeating reference time such as advancement to the next full second.

The central controller 204 determines which fixed time slots from which APs can be allocated for transmission and instructs the desired AP accordingly. Some factors central controller 204 uses for this determination include the traffic conditions, traffic delay and spatial RF-signature information. Network throughput is also improved by maximizing C/I conditions using time diversity. Central controller 204, one embodiment, also pre-assigns data rates to each transmitted frame, with the data rates dependent on the protocol, e.g., 802.11(a) or 802.11(b). This avoids the typical throughput loss caused by closed loop data rate control.

Figure 6:
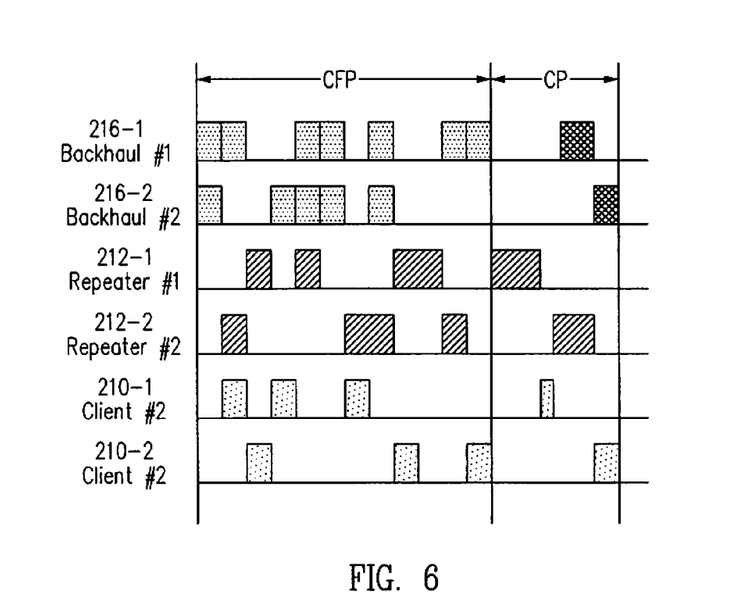
FIG. 6 is a time-line representation of transmission slots of using a single band.

Another advantage provided by the present invention is the ability to operate on multiple channels of the same band. In 802.11(a), there are twelve channels, while in 802.11(b), there are three channels. Conventional networks would experience transmission blockage from detected noise due to signal leakage into adjacent channels. As described above, a multi-hop network presents a significant bandwidth challenge if the standard 802.11 protocol is to be used. However, when central controller 204 is added to the network, transmissions can be adequately scheduled to eliminate this challenge. FIG. 6 shows a time-line representation of transmission slots, for both a contention-free period (CFP) and a contention period (CP), for two backhaul APs 216, two repeater APs 212, and two clients or STAs 210 (see FIG. 2) of scheduled TDMA. Central controller 204 coordinates all transmissions in the network, including backhauls. For example, in FIG. 2, when backhaul AP 216-1 transmits to repeater AP 212-1, backhaul AP 216-2 can transmit to repeater AP 212-2 or repeater AP 212-2 can serve an associated, such as STA 210-2. Thus, when repeater AP 212-2 transmits to backhaul AP 216-2, activity related to repeater AP 212-1 may take place. Central controller 204 schedules these transmissions based on signal conditions and data queues, similar to the above-described system. When only a single channel is used for backhaul and client service, repeater APs must be able to switch between backhaul mode (TDMA) and client service mode (802.11).

Figure 7:
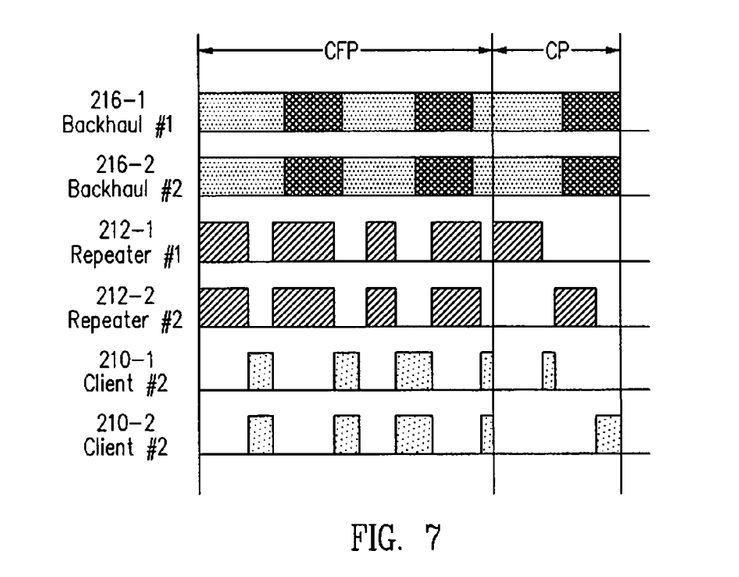
FIG. 7 is a time-line representation of transmission slots using two bands, according to one embodiment.

FIG. 7 shows a time line representation of transmission slots, similar to that of FIG. 6, except that transmission timing is with access points 212 and 216 that operate in dual-band 802.11, i.e., an AP is capable of transmitting concurrently on both 802.11(a) and 802.11(b) bands. With these types of WiFi off-the-shelf APs, one band (e.g., 802.11(a)) can be used for the backhaul communication (between backhaul APs 216 and repeater APs 212) and the other band (e.g., 802.11(b)) can be used for client communication (between backhaul APs 216 or repeater APs 212 and STAs 210). This further enhances network performance, as seen from FIG. 7.

Figure 8:
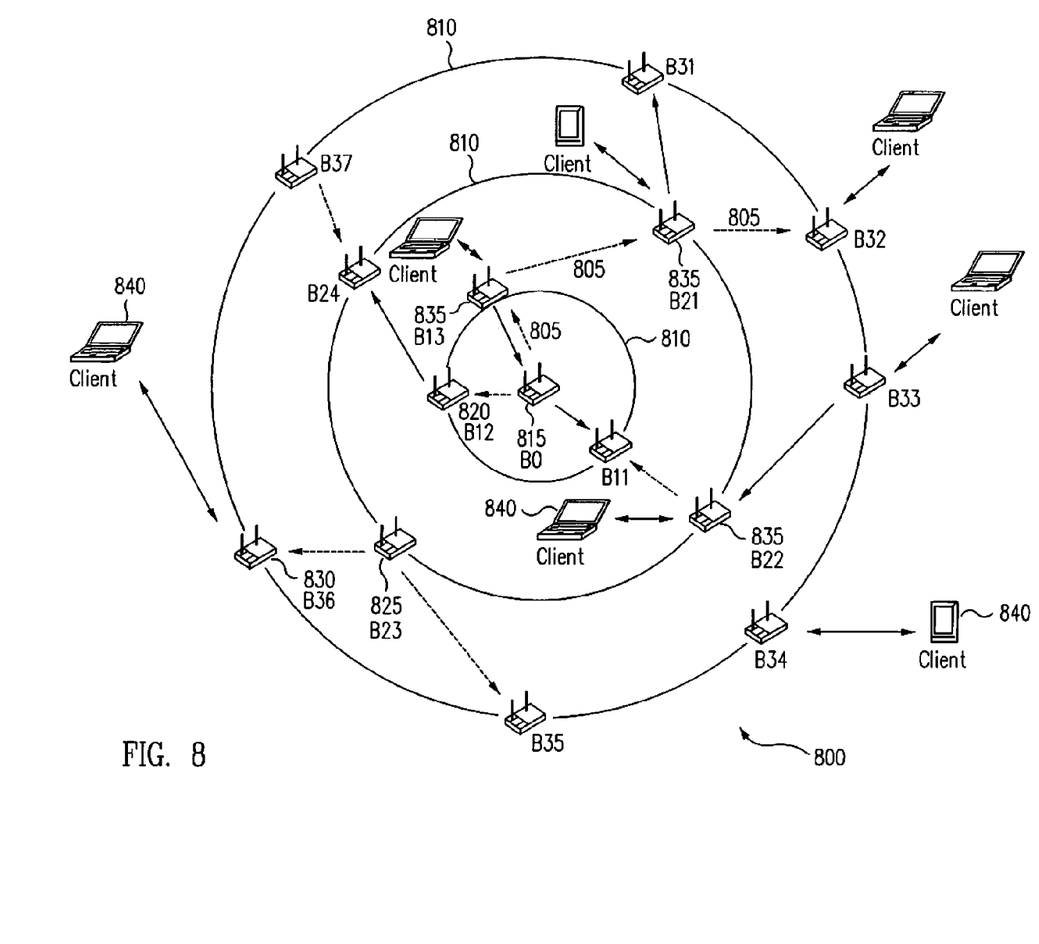
FIG. 8 is a diagram of a backhaul network topology according to one embodiment.

FIG. 8 shows a typical backhaul network topology 800, e.g., multi-hop connections 805 that are radially branching out such that imaginary circles 810 or spheres can be drawn.

It is quite evident that if all wireless connections are either inbound or outbound, it is very easy to find connections that can co-exist without interfering with each other. For example, a connection between a network nexus 815 and a $1^{st}$ tier bridge 820 can easily co-exist with a connection between $2^{nd}$ tier bridge 825 and a $3^{rd}$ tier bridge 830 and so on, if both connections are in the same direction. This quality can be exploited to operate the scheduled TDMA method of the present invention very efficiently, i.e., the probability to find connections that can co-exist is very high by default. Each network 800 of FIG. 8 may be called a "channel disk" since the whole network in the figure operates on a single frequency channel. Channel disks can be deployed such that their centers (or nexuses) are collocated or dislocated to different areas as needed. When one channel is getting loaded, traffic could be moved to another channel disk. Traffic could be moved to another channel disk if scheduling efficiency is reduced due to not enough spatial separation or uneven loading in the disk. Each repeater AP 835 in the network is a bridge: one band is used for backhaul while the other is used for communication with clients (STAs) 840.

Since network topology usually grows "radially", it is easy to find signal conditions that allow for concurrent transmission hence high network efficiency. Consequently, wireless backhaul can benefit from scheduled TDMA according to the present invention.

Each backhaul AP (either collocated in a network closet or distributed) is set on a specific "a" channel. The channel setting could be changed as needed, but normally the assignment is fixed. Wireless bridges are operating in a multi-tier regime, i.e., the first tier is closer (in terms of RF communication) to backhaul APs (such as in the nexus or network closet), the second tier is farther away than the first tier, and so on. FIG. 8 shows a "multi-tier" arrangement. This arrangement is naturally created as the wireless bridges are being deployed: the first set (tier 1) of bridges are deployed such that they have good connection to the network "nexus", i.e., the IT closet (tier 0) that contains the central bridge. Connectivity to other bridges at tier 1 should be low; otherwise there is a waste of resources. These conditions can be easily monitored using a wireless "sniffer". The second tier of bridge deployment is very similar, e.g., good connectivity to at least one bridge of tier 1 and weak connectivity to other tier 2 bridges. This process continues as needed to higher tiers, providing natural radially evolved network topology.

The number of bridges increases as a function of distance from the nexus 805 or IT closet hence "inner tier" bridges are normally communicating with one or more "outer tier" APs. Inner-tier bridges divide connection times between multiple outer-tier bridges based on data load and spatial signature. For example, if two outer-tier bridges are connected to an inner tier bridge and one has twice the data load, and both outer-tier bridges can transmit to the next outer circle layer bridges without interfering with the inner tier bridge receiving data from the backhaul AP, the transmission time will be divided 2:1 between the outer-tier bridges.

Figure 9:
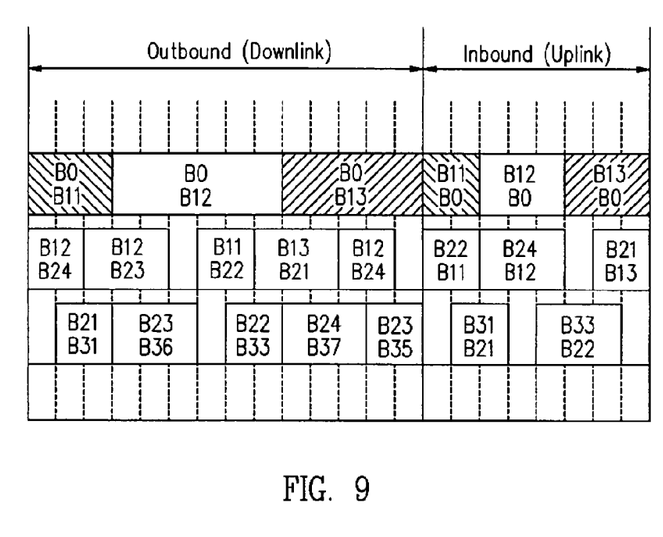
FIG. 9 is a timing diagram showing examples of transmission slots from the bridges of FIG. 8.

FIG. 9 shows an example of transmission scheduling. The source and destination time slots in FIG. 9 are labeled with correspondingly labeled APs in FIG. 8. System transmission is divided between outbound (downlink) and inbound (uplink) transmission. All network units are transmitting in the same direction. This is necessary to ensure non-interfering conditions. The central bridge at nexus 805 divides transmission time between three first tier bridges at the outbound and inbound period based on the amount of data. This division is not expected to change rapidly due to traffic aggregation. Due to network topology and deployment, the probability of interference between tiers is expected to be minimal hence TDMA scheduling can be easily executed. Scheduling control commands are transmitted as part of the payload. Each bridge continuously estimates its neighbor's reception level using RSSI measurements. The RSSI values are relayed to the central controller that is located somewhere in the network.

When load is very uneven or excessive, another network can be added on a different channel. Heavily loaded "network branches" can be moved from one channel to another, thereby allowing better loading of each channel. Multiple channels can exist either emanating from the same location or different locations as needed. All channels must have the same "outbound-inbound" periods. Transmission periods are divided into "slots", as shown in FIG. 9 to allow standard 802.11 PHY to demodulate frames correctly. Using high gain antennas in the "nexus" can ensure sufficient C/I conditions for the inner tier. For example, in FIG. 8, the RF distance ratio between a bridge on the first tier and the second tier from the nexus can be rather small (e.g., ~2:1), hence the C/I may not be adequate to sustain a high data rate. Using TX/RX diversity (i.e., selecting the TX antenna at the transmitting bridge and the receiving antenna at the receiving bridge) may help. Another option is to connect the nexus bridge to a sectorized antenna array, thereby increasing the C/I value.

To avoid frequent layer II ACK messages, the layer II ACK/NACK is incorporated within the opposite-bound slots, using a selective automatic repeat-request (ARQ) method. This is important in order to avoid "ACK collisions", since the present invention works well when all network nodes are either transmitting inbound or outbound at any time; transmissions of "WiFi style" ACKs cause concurrent two way transmission that may not be accommodated.

Traffic load between uplink and downlink can be accommodated by varying the ratio between outbound and inbound traffic periods. When one or more connections exhibit excessive traffic load, the connection can be moved to a different channel. Generally, each "channel disk" will perform best when the angular load distribution is quite even. Any time a channel disk becomes heavily loaded, part of the load can be shifted to a different channel disk. The present invention also allows point-to-multipoint transmission, i.e., a single slot could incorporate multiple destinations.

The present invention also mitigates interference from both fixed and variable sources. Because 802.11 networks use public shared spectrums, they are susceptible to un-controlled interference. This interference may come from other 802.11 sources, such as neighboring networks or other electromagnetic emissions. Unlike other reliable wireless networks (e.g., cellular and MMDS) where the communication spectrum is well controlled (and hence very costly), 802.11 networks may not be used where highly reliable service is needed. This fact may become a great stumbling block for 802.11 proliferations into the enterprise and wide area network service.

One area where the present invention improves communication is where the channel has fixed or constant interference. Standard 802.11 network deployment requires use of different channels to separate contiguous BSSs (frequency planning) to facilitate basic network operation. Hence, at most network locations, only single channel coverage is provided. Central controller 204 provides for much larger 802.11 network bandwidth and more specifically, ability to operate 802.11 networks with extensive overlapping BSSs. As a result, the network can be deployed such that every STA location is covered with multiple 802.11 channels.

The presence of multiple channels at STA locations provides for diversity. For example, a STA could select the best channel out of a plurality of channels. A channel is defined to be "best", in one embodiment, by the maximum serving signal level and minimum interference. Common STAs are generally able to select maximum signal strength, but minimum interference needs to be specially determined. Minimum interference can be determined by a STA monitoring the channel for messages that do not belong to its own BSS and signals that are not 802.11-generated. For example, if at the location of STA 210-1, channel #6 is constantly interfered, STA 210-1 can select channel #1 or #11 (if 802.11(a)). Furthermore, even when no interference is present, STA 210-1 could select the highest signal level channel for best performance (assuming APs are not collocated, the signal level is a random variable with a great variance, so ability to select the channel could provide a significant advantage).

External interference levels can be considered a random variable at each location in the network. It can be assumed that this random variable value is independent between channels. Hence, the availability of multiple choices for the STA can greatly reduce the probability of blocking a connection due to interference. If the probability of blocking the connection as a result of interference is P, and the STA can select one out of m channels for use, the probability of continuous blocking reduces down to $P^m$. For example, if P=0.30 (or 30%), the probability of blocking when three channels are available for STA use is $0.3^3=0.027$, a reduction of 91%.

Another area where the present invention improves communication is where the channel has variable or time-varying interference (as opposed to constant interference discussed above). The mitigation is through the extra bandwidth provided by central controller 204, which provides two advantages. First, the extra bandwidth allows extra fragmentation, whereby higher level packets and larger management frames are broken into smaller packets for transmission through the channel. With conventional 802.11 networks, fragmentation increases overhead, due to additional control protocols, which quickly consumes available network bandwidth. However, fragmentation, in general, provides better performance in communication environments prone to interference. Consequently, the additional available bandwidth provided by the present invention allows added interference mitigation because additional fragmentation is possible. A second advantage of additional bandwidth is that the number of "retries" or attempts to re-transmit the packet or frame can be increased. For example, in case of failure of layer 2 frame delivery, the 802.11 protocol may execute a layer 2 re-try. When the channel conditions that contributed to the failure are quickly varying, this mechanism can be very effective. However, like fragmentation, allowing more re-tries leads to bandwidth consumption. Thus, the additional bandwidth permits more re-tries, which improves performance in interference prone environments.

A further advantage of the present invention is that STAs can reduce their transmission power compared to conventional networks. For example, when each area is "covered" by at least two access points, the probability to have a good connection out of the two is increased dramatically relative to a single access point coverage. This is an example of "macro-diversity". It is especially important in mobile scenarios where the best reception may not be by the associated AP (e.g., due to Rayleigh fading and varying shadowing conditions). If at least two APs can receive the STA or mobile client, the anticipated gain could be about 6 dB or more, which would allow the STA to reduce it transmission power while still achieving the same performance.

Thus, by using scheduled TDMA of the present invention, a wireless LAN using off-the-shelf WiFi equipment, such as access points and stations, can be implemented that allows higher bandwidth utilization, which provides various advantages over conventional systems, as discussed above.

The above-described embodiments of the present invention are merely meant to be illustrative and not limiting. It will thus be obvious to those skilled in the art that various changes and modifications may be made without departing from this invention in its broader aspects. For example, the above description focused on scheduled TDMA with WiFi, 802.11, and WLANs. However, other wireless networks, such as wide area networks (WAN) and wireless backhaul in enterprise deployment, can also be suitable with the present invention. Furthermore, the scheduled TDMA has been described as being executed by a central controller. However, scheduled TDMA and the ideas and concepts discussed herein may also be executed by a distributed process that resides on the access points. This assumes that there is enough computation power in the access points and sufficient bandwidth on the backhaul, allowing very fast communication between the APs. Therefore, the appended claims encompass all such changes and modifications as fall within the true spirit and scope of this invention.

What is claimed is:

1. A system of regulating wireless traffic between a plurality of backhaul access points and a plurality of repeater access points, each of the repeater access points to communicate with at least one of the backhaul access points over a first frequency range, at least one of the repeater access points to communicate with a client device over a second frequency range different from said first frequency range, said system comprising:
a central controller communicatively coupled to each of said backhaul access points, said central controller to schedule wireless transmissions between said repeater access points and said backhaul access points based on estimated signal conditions at designated receivers of said wireless transmissions, the central controller to enable said client device to communicate with a said backhaul access point over a multi-hop connection through said at least one of the repeater access points;
the central controller further to
determine which wireless transmissions between said repeater access points and said backhaul access points that can be executed simultaneously; and
schedule said wireless transmissions to maximize a number of simultaneous wireless transmissions between said repeater access points and said backhaul access points.

2. The system of claim 1, wherein the central controller is to communicate with the plurality of backhaul access points over a wired network,
such that the client device is to communicate with the wired network over the multiple-hop connection through the first said repeater access point and the first said backhaul access point.

3. The system of claim 1, wherein the first frequency range is in accordance with one of IEEE 802.11b and IEEE 802.11g, and the second frequency range is in accordance with IEEE 802.11a.

4. The system of claim 1, wherein the first frequency range includes 2.4 gigahertz (GHz) and the second frequency range includes 5 GHz.

5. The system of claim 1, wherein the first said backhaul access point comprises a directional antenna to wirelessly communicate with the first said repeater access point using the first frequency range,
and wherein the first said repeater access point comprises:
a directional antenna to wirelessly communicate with the first said backhaul access point using the first frequency range; and
an omni-directional antenna to wirelessly communicate with the client device using the second frequency range.

6. The system of claim 1, wherein the client device is a first client device, and wherein the system further comprises:
a second backhaul access point, different than the first backhaul access point, to wirelessly communicate using the first frequency range; and
a second repeater access point, different than the first repeater access point, to wirelessly communicate with the second backhaul access point using the first frequency range and to wirelessly communicate with a second client device using the second frequency range.

7. The system of claim 6, wherein the first frequency range comprises a first frequency channel and a second frequency channel different than the first frequency channel,
wherein the first repeater access point is to wirelessly communicate with the first backhaul access point using the first frequency channel,
and wherein the second repeater access point is to wirelessly communicate with the second backhaul access point using the second frequency channel.

8. The system of claim 6, wherein if a first communication transmission is from the first backhaul access point to the first repeater access point, and a second communication transmission is from the second backhaul access point to the second repeater access point,
and the central controller is to schedule the first and the second communication transmissions in relation to one another using time-division multiple access (TDMA) to reduce interference between the first and the second communication transmissions.

9. The system of claim 8, wherein if a third communication transmission is between the first repeater access point and the first client device, and a fourth communication transmission is between the second repeater access point and the second client device,
the third and the fourth communication transmissions are scheduled in relation to one another using scheduled TDMA.

10. The system of claim 6, wherein the first backhaul access point and the second backhaul access point are collocated within a common physical location.

11. The system of claim 6, wherein the first backhaul access point and the second backhaul access point are located at different physical locations along an existing wired network.

12. The system of claim 1, wherein the first access point and the second access point are located at different physical locations at which the existing wired network is absent.

13. A method comprising:
wirelessly communicating between a first backhaul access point and a first repeater access point using a first frequency range;
wirelessly communicating between a second backhaul access point and a second repeater access point using said first frequency range;
wirelessly communicating between the first repeater access point and a first client device using a second frequency range different than the first frequency range, such that the first client device communicates with the first backhaul access point over a first multiple-hop connection using the first said repeater access point;
wirelessly communicating between the second repeater access point and a second client device using said second frequency range, such that the second client device communicates with the second backhaul access point over a second multi-hop connection using the second said repeater access point;
scheduling wireless transmissions between said first backhaul access point, said first repeater access point, said second backhaul access point, and said second repeater access point based on estimated signal conditions at designated receivers of said wireless transmissions;
determining which wireless transmissions between said repeater access points and said backhaul access points that can be executed simultaneously; and
scheduling said wireless transmissions to maximize a number of simultaneous wireless transmissions between said repeater access points and said backhaul access points.

14. The method of claim 13, further comprising:
communicating between a central controller and the backhaul access point over a wired network,
such that the client device communicates with the wired network over the multiple-hop connection through said one of the repeater access points and the backhaul access point.

15. The method of claim 13, wherein the first frequency range comprises a first frequency channel and a second frequency channel different than the first frequency channel,
wherein wirelessly communicating between the first said backhaul access point and the first said repeater access point comprises using the first frequency channel,
and wherein wirelessly communicating between the second said backhaul access point and the second said repeater access point comprises using the second frequency channel.

16. The method of claim 13, wherein a first communication transmission is from the first backhaul access point to the first repeater access point, and a second communication transmission is from the second backhaul access point to the second repeater access point,
and wherein the method further comprises:
scheduling the first and the second communications in relation to one another using time-division multiple access (TDMA) to reduce interference between the first and the second communication transmissions.

17. An apparatus, comprising:
a processor;
a memory communicatively coupled to said processor, said memory comprising executable code stored thereon, said processor being configured to, upon execution of said executable code:
receive signal strength information from a plurality of repeater access points and backhaul access points;
estimate wireless signal conditions at said repeater access points and said backhaul access points;
schedule wireless transmissions between said repeater access points and said backhaul access points based on said estimated wireless signal conditions;
determine which wireless transmissions between said repeater access points and said backhaul access points that can be executed simultaneously; and
schedule said wireless transmissions to maximize a number of simultaneous wireless transmissions between said repeater access points and said backhaul access points.

18. The apparatus of claim 17, wherein said executable code further causes said processor to receive information about a data traffic load among the plurality of repeater access points and backhaul access points; and wherein said wireless transmissions are scheduled also based on received information about said data traffic load.

19. The apparatus of claim 17, wherein said executable code further causes said processor to communicate with said plurality of backhaul access points and said plurality of repeater access points to synchronize clocks in said plurality of backhaul access points and said plurality of repeater access points.

* * * * *